United States Patent [19]

Engel

[11] 4,180,841
[45] Dec. 25, 1979

[54] GROUND FAULT CIRCUIT INTERRUPTER WITH GROUNDED NEUTRAL PROTECTION

[75] Inventor: Joseph C. Engel, Monroeville, Pa.

[73] Assignee: Westinghouse Electric Corp., Pittsburgh, Pa.

[21] Appl. No.: 853,370

[22] Filed: Nov. 21, 1977

[51] Int. Cl.² .............................................. H02H 3/28
[52] U.S. Cl. ...................................................... 361/45
[58] Field of Search ............................ 361/42, 44, 45

[56] References Cited

U.S. PATENT DOCUMENTS

| 3,852,642 | 12/1974 | Engel et al. | 361/45 |
| 3,953,766 | 4/1976 | Howell et al. | 361/45 |
| 3,959,693 | 5/1976 | Coley et al. | 361/45 |

*Primary Examiner*—Harry E. Moose, Jr.
*Attorney, Agent, or Firm*—Robert E. Converse, Jr.

[57] ABSTRACT

A ground fault circuit interrupter includes a differential current transformer sensing winding supplying input to an integrator which is reset to zero at the end of each half-cycle of AC line current. A line-to-ground fault current will cause the integrator output to exceed a predetermined limit value and produce a trip indication. A saturable neutral transformer supplies a voltage to the neutral line and a reference current proportional to the neutral voltage to a comparator. The peak value of the reference current is compared to the peak value of the sensing winding output. A low-resistance neutral-to-ground path causes the sensing winding output to exceed the reference current and a signal to be added to the integrator input, thereby producing a trip indication which energizes an SCR to activate a solenoid. Means are provided to produce a positive feedback signal to insure a "hard" turn-on of the SCR upon receipt of a trip indication, the feedback means also including capability to "remember" a trip indication at the end of a half-cycle near current zero, and to produce the positive feedback signal at the beginning of the next succeeding half cycle.

16 Claims, 5 Drawing Figures

GROUND FAULT CIRCUIT INTERRUPTER WITH GROUNDED NEUTRAL PROTECTION

BACKGROUND OF THE INVENTION

The invention relates generally to ground fault circuit interrupters and, more particularly, to ground fault circuit interrupters providing protection against grounded neutral conductors.

Conventional electrical circuits such as fuses and circuit breakers protect circuit conductors from thermal damage due to severe overload currents, thereby greatly reducing the danger of fire and explosion. However, such conventional circuit interrupters do not eliminate the danger of electrical shock to a person accidentally coming into simultaneous contact with a live conductor and an object at ground potential. The resulting current flow through the person, while only a fraction of an ampere, can cause serious injury or death.

Ground fault circuit interrupters (hereinafter referred to as GFCI's) combine the capabilities of conventional circuit breakers with sensitive means for detecting current flow between line conductors and ground at current levels much below the overload current levels required to trip conventional circuit breakers. Upon detection of such a ground fault current the contacts of the GFCI are opened to deenergize the circuit.

A differential current transformer is normally used to sense these ground fault currents, the transformer having as its primary windings the conductors of the distribution system being protected. During normal conditions, all current flowing in one direction through one of the conductors will return in the opposite direction on another of the conductors, this producing a net current flow of zero through the transformer. However, if a fault (that is, a leakage path) is established between one of the conductors and ground, return current will bypass the transformer and flow through the ground back to the grounded side of the source supplying the circuit. Thus, more current will be flowing in one direction through the transformer than through the other, producing a current imbalance.

A sensing winding detects this imbalance and provides an output signal used in various ways for the common purpose of tripping a circuit breaker mechanism when the sensed signal is of sufficient magnitude. One method of utilizing the signal of the sensing winding to produce a trip indication is described in U.S. Pat. No. 3,852,642 issued Dec. 3, 1974 to the present inventor and others and assigned to the assignee of the present invention. The device disclosed therein responds primarily in accordance with the peak value of the sensing winding signal.

Such circuits resulted in generally satisfactory operation. However, performance standards for GFCI's as established by Underwriter's Laboratories have been increased to specify a trip level of 5 ma.±20% for all ambient and load conditions. The trip levels of some prior art GFCI's were dependent upon normal load currents to the extent that the tightened specifications resulted in an increase in unnecessary trip indications, often referred to as "nuisance tripping". It is believed that this effect is caused primarily by a false output from the differential current transformer at a frequency equal to twice the line voltage frequency; that is, 120 Hz on a 60 Hz system. The false 120 Hz output, when added to the actual 60 Hz output, results in a composite output current the peak value of which is a function of load current. This false output is believed to be caused by stray magnetic fields existing in the vicinity of the current transformer caused by difficult to control variables such as the exact location of current carrying conductors near the transformer within the circuit breaker, input offset voltage for the sense amplifier, residual flux in the core, and others. A direct solution to this problem would include shielding the transformer and using more symmetrical lead routing. Unfortunately, the size and space restrictions within the housings of GFCI's do not always permit such shielding, and the conductor locations are dictated by manufacturing considerations.

A method for alleviating the problems caused by 120 Hz false current is to make the trip indication dependent upon an integral of the current transformer output. As example of this approach is the device described in U.S. Pat. No. 3,953,767 issued Apr. 27, 1976 to Ahmed. This device sums the sensed signal over a period of at least a fully cycle of line voltage primarily for the purpose of distinguishing between resistive ground faults and capacitive ground faults. This has the incidental benefit of reducing any 120 Hz signal which may be present, since over each half cycle of power line frequency the integral of a 120 Hz will be zero.

There are, however, other requirements for a commercially practical GFCI. Underwriter's Laboratories specifies that a GFCI must also trip upon occurrence of a low-impedance leakage path from the neutral conductor to ground. Such a path on the load side of the differential current transformer does not in itself produce a shock hazard; however, the occurrence of a grounded neutral at the same time as a ground fault on a line conductor will cause the GFCI to be less sensitive in detecting ground fault current from the line conductor.

Various means have been successfully employed to detect a grounded neutral conductor, including the device described in U.S. Pat. No. 3,959,693 issued May 25, 1976 to Coley and Misencik and assigned to the assignee of the present invention. The device disclosed therein employs an additional transformer having a primary winding connected between the line and neutral conductors, with the neutral conductor serving as a secondary winding. The core of this neutral transformer is designed to saturate early in each half cycle of the power line frequency. The transformer thus induces a voltage pulse on the neutral conductor on each half cycle, producing a current flow on the neutral conductor if there is a path from it to ground near the load. Since this current returns through the ground, a current imbalance will result which will be detected in a manner similar to a ground fault by the differential current transformer to produce an output from the sense winding.

Another means for detecting a grounded neutral conductor employs a pulse generator inducing high frequency voltage pulses upon the neutral conductor. This method is described in U.S. Pat. No. 3,611,035 to Douglas.

Both of the foregoing techniques are generally effective to detect leakage paths from neutral to ground. However, both produce a ground current having a fairly large peak value but a very limited average value over one cycle of the power line frequency. Thus, these techniques as previously utilized are not directly applicable to apparatus employing an integration technique, such as the device described in the aforementioned U.S. Pat. No. 3,953,767, since the pulses provided by the grounded neutral detection system would be cancelled by integration.

A ground fault detection system providing grounded neutral protection and utilizing an integrator is described in U.S. Pat. No. 3,963,963 issued June 15, 1976 to Schade. This system employs two synchronous switches, one operating at line frequency and the other operating at the frequency of the oscillator generating the neutral conductor pulses, to activate the integrator only at such time as the positive neutral pulses are occurring. Various problems still remain, however, such as the dependence of trip level on load current.

It would be desirable to provide a GFCI having grounded neutral protection which meets current Underwriter's Laboratories requirements as established in Bulletin 943 which call for a 5 ma. trip level ±20%. In addition, the device must be sufficiently compact to fit in existing circuit interrupter housings and must minimize the volume and number of parts required. It would be especially desirable to provide a GFCI which can be adapted for operation using an integrated circuit.

SUMMARY OF THE INVENTION

In accordance with a preferred embodiment of the present invention there is provided ground fault protective apparatus for use on an AC electrical circuit having a line conductor and a neutral conductor. The apparatus comprises means for sensing current imbalance on the conductors and for providing an output signal proportional to the current imbalance. Means are also provided for integrating the output signal over a period of one half cycle of the current and for providing a trip indication whenever the signal integration exceeds a predetermined reference. Grounded neutral detection capability is provided by a saturable transformer inducing a test voltage on the neutral conductor to produce a current imbalance between the line and neutral conductors which is proportional to the neutral to ground resistance. The transformer also provides a reference current proportional to the neutral conductor test voltage. This reference current is compared to the output of the sensing means and supplies a signal current to the input of the integrator whenever the output of the sensing means rises above the reference current, indicating a low resistance neutral-to-ground path. The amplitude of this signal current is sufficient to cause the integrator to rise above the trip current level before the end of the present half cycle, thereby producing a trip indication.

An SCR is responsive to the trip indication to energize a solenoid, thereby operating the circuit breaker contacts to deenergize the circuit being protected. Means responsive to the trip indication of the integrator are provided to supply a feedback signal to the input of the integrator which is additive to the output signal of the sensing means. This feedback signal is of sufficient magnitude to cause a trip indication, thereby providing a "hard" turn-on for the SCR. In addition, a memory circuit responsive to a trip indication is provided, so that a trip indication which is produced at the end of a half cycle near current zero (during which time the SCR may not be activated) will result in a trip indication being generated early in the next succeeding half cycle during which time SCR turn-on is insured.

DESCRIPTION OF THE PREFERRED EMBODIMENT

Figure 1:
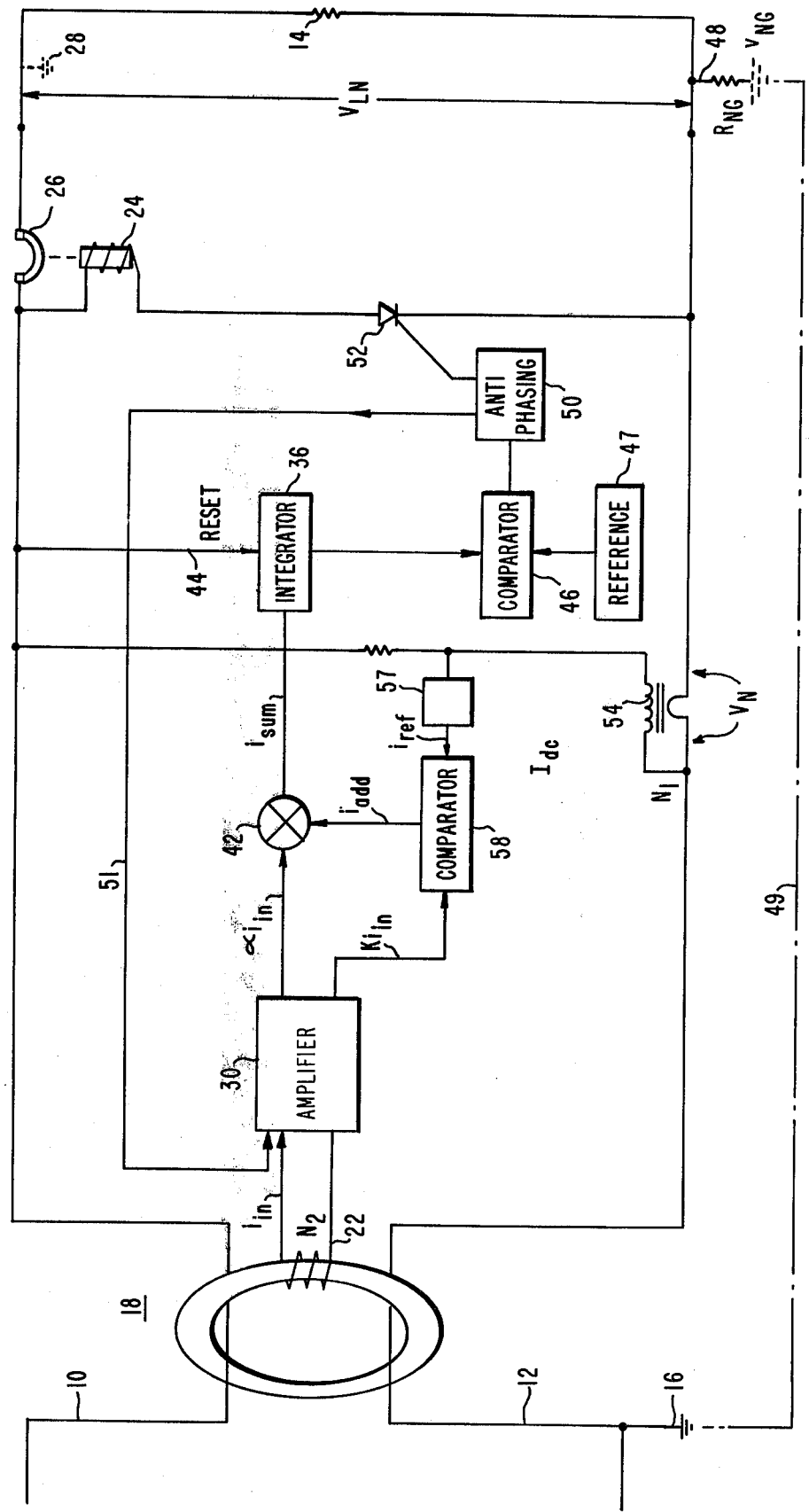
FIG. 1 is a functional block diagram of a ground fault circuit interrupter constructed in accordance with the present invention.

A GFCI constructed according to the teachings of the present invention is shown in FIG. 1. A line conductor 10 and neutral conductor 12 pass through a differential current transformer 18. The neutral conductor 12 is grounded at the point 16. A sensing winding 22 provides input $i_{in}$ to an amplifier 30 having two outputs, the first of which, $\alpha i_{in}$, is supplied through a summer 42 to an integrator 36. The integrator 36 is reset at the end of each half cycle of line voltage by the lead 44. The output of the integrator 36 is fed to a comparator 46 which compares the integrator output to a reference 47 (the value of which is specified by the desired tripping current level) and supplies a signal through anti-phasing circuitry 50 (to be more completely described hereinafter) to a silicon controlled rectifier (SCR) 52 which controls a solenoid 24 and interrupter contacts 26.

Upon occurrence of a ground fault between the conductor 10 and ground, as at 28, a portion of the current flowing from the source through conductors 10 and 12 will return to the source through the ground and will not pass through the transformer 18. A current imbalance thus occurs between the conductors 10 and 12 producing an output signal $i_{in}$ from the sensing winding 22. This signal is amplified by the amplifier 30 and supplied through the summer 42 to the integrator 36. Ground fault current above the predetermined tripping current level will cause the output of the integrator 36 to rise above the reference as supplied by 47 to activate the SCR 52, thereby energizing the solenoid 24 and the contacts 26 to interrupt current flow through the load 14.

Detection of low resistance paths between the neutral conductor 12 and ground is provided by a saturable transformer 54 as is described in the aforementioned U.S. Pat. No. 3,959,693. The transformer 54 has a primary winding connected between the line conductor 10 and the neutral conductor 12, and has the neutral conductor 12 serving as a secondary winding. The core of the transformer 54 is designed to saturate within a brief portion of each half cycle of power line frequency. Until saturation, the transformer induces a voltage pulse $V_N$ on the neutral conductor 12 which will, under normal conditions, result in no current flow since no complete circuit exists. However, if there is a low resistance path to ground from the neutral conductor near the load, the voltage will cause an imbalanced current detectable by the differential current transformer 18. Such a path is indicated at 48 and will result in current flow in the circuit defined by the conductor 12, the ground path 48, the ground 49 itself, and the ground connection 16. The current pulse so produced, while having a relatively high peak value, has a very low average value. Thus, in the prior art such a current pulse was not easily detected by integration, especially over a period as short as one half a cycle.

Since integration over a half cycle with a reset pulse occurring at the end thereof is desirable, additional means are provided in the present invention to detect low resistance neutral-to-ground paths. Specifically, means 57 produce a reference current which is proportional to the voltage induced upon the neutral conductor 12. This reference current (indicated in FIGS. 1 and 2 by $i_{ref}$) is supplied to a comparator 58. The amplifier 30, in addition to supplying the output $\alpha i_{in}$ to the summer 42, produces a second output $Ki_{in}$ which is supplied to the comparator 58. The peak values of $Ki_{in}$ and $i_{ref}$ are compared to establish the value of output current $i_{add}$ which is supplied to the summer 42. The summation i sum of currents $\alpha i_{in}$ and $i_{add}$ is then supplied to the integrator. During normal conditions having no low resistance neutral-to-ground paths, $i_{ref}$ is greater than $Ki_{in}$, the value of $i_{add}$ is zero, and $i_{sum} = \alpha i_{in}$. If a path such as is indicated at 48 should occur, however, the resulting current imbalance will be detected by the sensing winding 22 and amplified by the amplifier 30 to produce a larger value of $Ki_{in}$. This value will be greater than $i_{ref}$ and will produce a value of $i_{add}$ equal to $Ki_{in}$, and a value of $i_{sum}$ equal to $\alpha i_{in}$ plus $Ki_{in}$. This input to the integrator 36 is sufficient to raise the integrator output above the value produced by reference 47, thereby producing a trip indication. Thus, neutral-to-ground paths are detected by combining a peak sensing function performed at the comparator 58 with an integration function performed by the integrator 36 to provide adequate sensitivity to trip upon low resistance neutral-to-ground paths.

For ground fault currents just slightly above the trip level, the output of the integrator 36 will rise above the reference level at the end of the half cycle. Unfortunately, the instantaneous value of line voltage at this time in the cycle may be too small to trip the solenoid 24 when the SCR 52 is triggered. Since the integrator is reset at the end of a half cycle and will start out from zero at the beginning of the next half cycle, the possibility exists that a trip indication toward the end of the half cycle will be lost.

This possibility is eliminated by means of an antiphasing system indicated at 50. The trip output of the comparator 46 is fed to the system 50 which contains a capacitive "memory". The capacitor "remembers" that it had received a trip signal at the end of the preceding half cycle and produces positive feedback current (indicated by the path 51 of FIG. 1) to the input amplifier 30 early in the half cycle succeeding the trip condition, thereby producing a larger value of $\alpha i_{in}$ which is processed by the integrator 36 to quickly produce a trip indication early in the half cycle and energize the solenoid 24 to separate the contacts 26. The positive feedback thus produces a latching type turn-on function which eliminates the phasing problem. In addition, the latching process coupled with other circuit features to be hereinafter described makes it possible to operate the circuit at a line voltage of as low as 50 volts AC.

The TEST button operates by deliberately establishing a ground fault current of a known level between the line conductor and ground through resistor R6. If the apparatus is operating properly, a trip action will occur.

Figure 2:
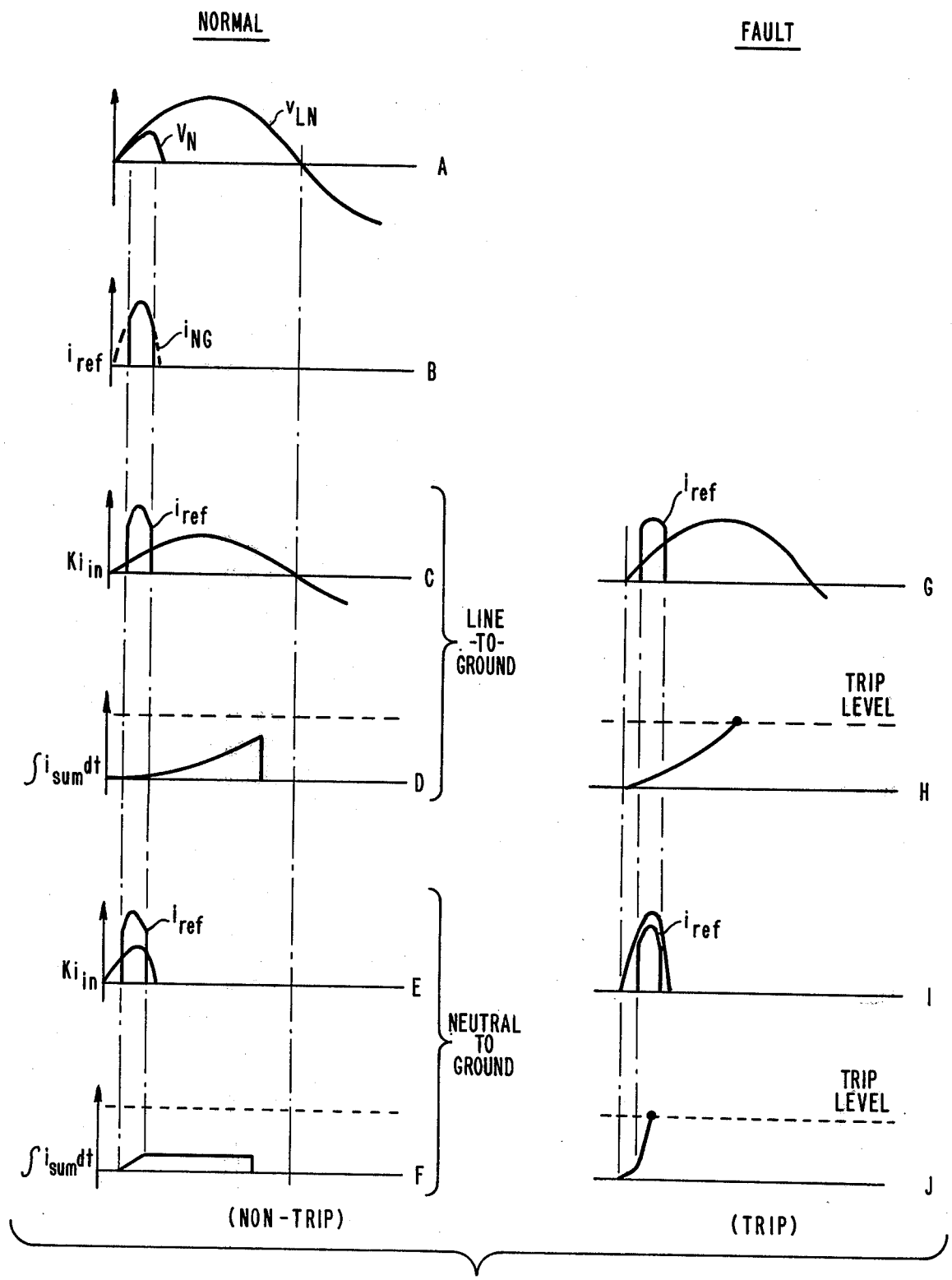
FIG. 2 is a set of curves showing wave forms pertinent to the operation of the apparatus shown in FIGS. 1 and 3-5.

Operation of the apparatus of FIG. 1 may be more clearly understood by reference to the waveforms of FIG. 2. Waveform A of FIG. 2 shows the voltage $V_{LN}$ between the line conductor 10 and the neutral conductor 12. Also shown is the voltage $V_N$ produced by the neutral transformer 54 on the neutral conductor 12. As can be seen, the neutral voltage is a short pulse due to the saturating properties of the transformer 54. A reference current $i_{ref}$ is produced by the circuit 57 and has a peak value proportional to the neutral voltage $V_N$. The edges of the current pulse $i_{ref}$ have been shaped as shown in waveform B to provide more consistent operation.

The value of $Ki_{in}$ generated by normal leakage conditions below the ground fault trip level is shown in waveform C of FIG. 2. Superimposed upon this current is the neutral reference current $i_{ref}$. Since $Ki_{in}$ is less than $i_{ref}$, $i_{add}$ equals zero and $i_{sum}$ equals $\alpha i_{in}$. It can be seen in waveform D that the integrator output produced by this normal line-to-ground current over the period of one half cycle is less than the trip current level. Also, the action of the reset signal upon the integrator 36 is shown in waveform D as it reduces the value of the integral to zero just prior to the end of the half cycle.

The value of $Ki_{in}$ generated by normal neutral-to-ground current is shown in waveform E of FIG. 2. It can be seen that during normal operation, this value of $Ki_{in}$ is also less than the peak value of the neutral reference current $i_{ref}$. Thus, $i_{add}$ equals zero, $i_{sum}$ equals $\alpha i_{in}$, and the output of the integrator 36 remains below the tripping current level as shown in waveform E.

Upon occurrence of a fault between the line conductor 10 and ground, as at 28 of FIG. 1, a current imbalance is produced between the conductors 10 and 12 resulting in a higher output from the sensing winding 22. Under these conditions the peak value of $Ki_{in}$ may or may not be greater than $i_{ref}$. However, the value of a $i_{in}$ alone is sufficient to cause trip indication as shown in waveform H of FIG. 2 wherein it can be seen that the value of the integral rises to the trip level before the end of the half cycle. Thus, the solenoid 24 will be activated to separate the contacts 26 and deenergize the load 14.

A low resistance neutral-to-ground path 48 (FIG. 1) results in a neutral-to-ground current producing an output $Ki_{in}$ from amplifier 30. Since $Ki_{in}$ is greater than the neutral reference current $i_{ref}$ (waveform I), a value of $i_{add}$ equal to $Ki_{in}$ is added to $\alpha i_{in}$, producing an integrator output as shown in waveform J. This output rapidly rises above the trip level to produce a tripping operation as described above.

An electronic circuit embodying the principals of the present invention is shown schematically in FIG. 3, and will be described in sections.

BREAKER CIRCUIT

Figure 3:
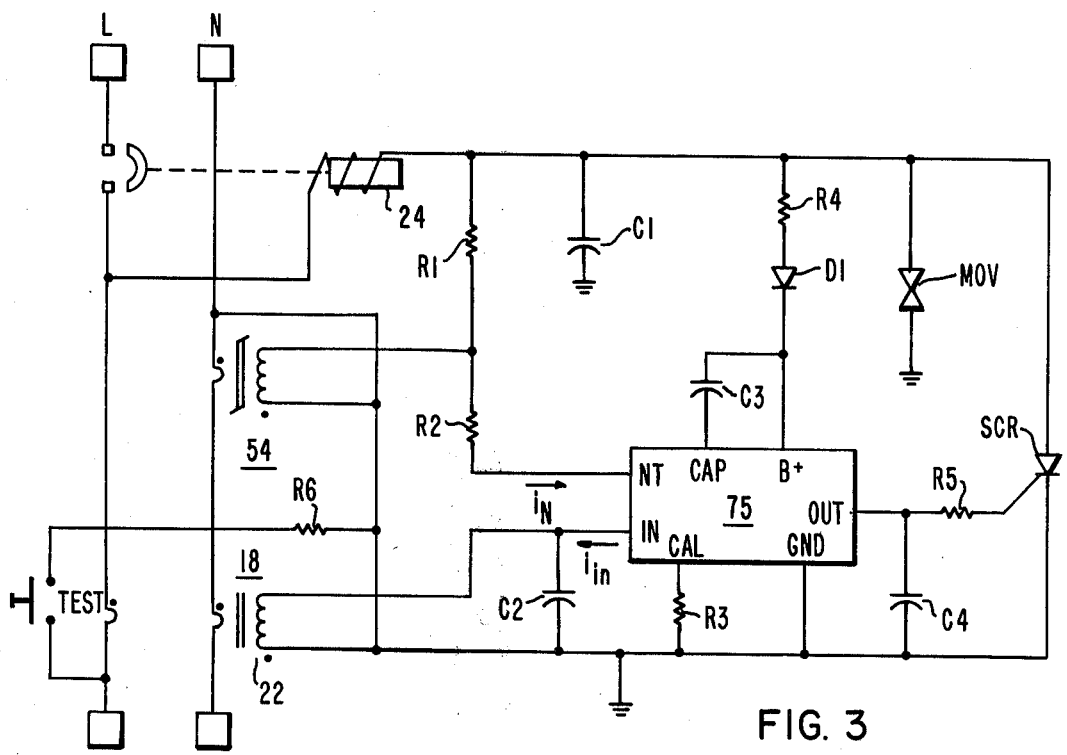
FIG. 3 is a detailed schematic diagram of the present invention in accordance with one specific embodiment.

The breaker version of the present invention is shown in FIG. 3. As can be seen, the main circuit element is an integrated circuit, or chip 75, the internal design details of which will be discussed in the following sections. At this time it will be treated as a simple seven terminal circuit element.

The chip 75 is powered by a dropping resistor, R4, which supplies a nearly sinusoidal bias current of slightly more than 2 ma RMS from the 120 V ac supply. The bias resistor dissipates 0.15 watts at 132 V ac line voltage. The voltage from B+ to GND is a square wave with a value of 14 volts during the positive half cycle of the supply and 0 volts during the negative half cycle. The chip can function only when the B+ terminal is positive, and thus the unit operates in a half wave manner.

The secondary winding 22 of the differential current transformer 18 is connected directly to the IN terminal. The polarity is such that normal line-to-ground current produces a current $i_{in}$ out of the IN terminal. The chip 75, by means of internal voltage feedback, maintains the IN terminal near virtual ground. The capacitor C2 is used as an RF filter.

The current flow out of the IN terminal flows from the B+ supply through C3 into the CAP terminal. The voltage drop across C3 thus represents the integral of the current $i_{in}$. At the end of the positive half cycle the voltage at the B+ terminal drops below 14 volts which energizes circuitry within the chip 75 to reset the capacitor C3 to zero. At the beginning of the next positive half cycle the reset circuit is turned off, and the capacitor C3 starts to be charged again. The voltage across the capacitor C3 at the end of each cycle thus represents the half cycle integral of the current $i_{in}$ which is proportional to half cycle average current of the 60 Hz ground current.

A voltage comparator on the chip 75 compares the voltage across C3 to a voltage reference of about 1.6 volts. When the capacitor voltage exceeds the reference, current begins to flow from the OUT terminal into the capacitor C4. An external resistor R3 can be used to adjust the reference voltage to calibrate the circuit. Internal positive feedback on the chip 75 produces rapid charging of C3 which causes C4 to charge to the gate conduction voltage of the SCR 52, turning on the SCR.

For ground currents which barely exceed the trip level, the SCR turns on at the end of the half cycle. Capacitor C4 is the memory element of the "anti-phasing" circuit 50. The capacitor C4 retains its charge during the next negative half cycle of the line voltage so that the positive feedback circuit is still energized at the beginning of the next positive half cycle. The SCR is thus turned on hard at the beginning of the cycle eliminating phasing problems and possible solenoid "chattering". This feature makes it possible for the circuit to function normally with a line voltage as low as 50 volts RMS. Another important function of the gate capacitor C4 is to provide a low ac gate-to-cathode impedance which greatly improves the dv/dt capability of the SCR.

A neutral-to-ground resistance of less than 2 ohms causes an internal current on the chip 75 (one of two outputs of the input amplifier 30) to exceed the neutral reference current $i_{ref}$ produced by current $i_N$ flowing into terminal NT through R2. (Current $i_N$ is caused by input to the neutral transformer 54.) The current $i_{sum}$ then flows into capacitor C3 which causes it to rapidly charge to the trip level turning on the SCR 52.

INPUT AMPLIFIER

Figure 5:
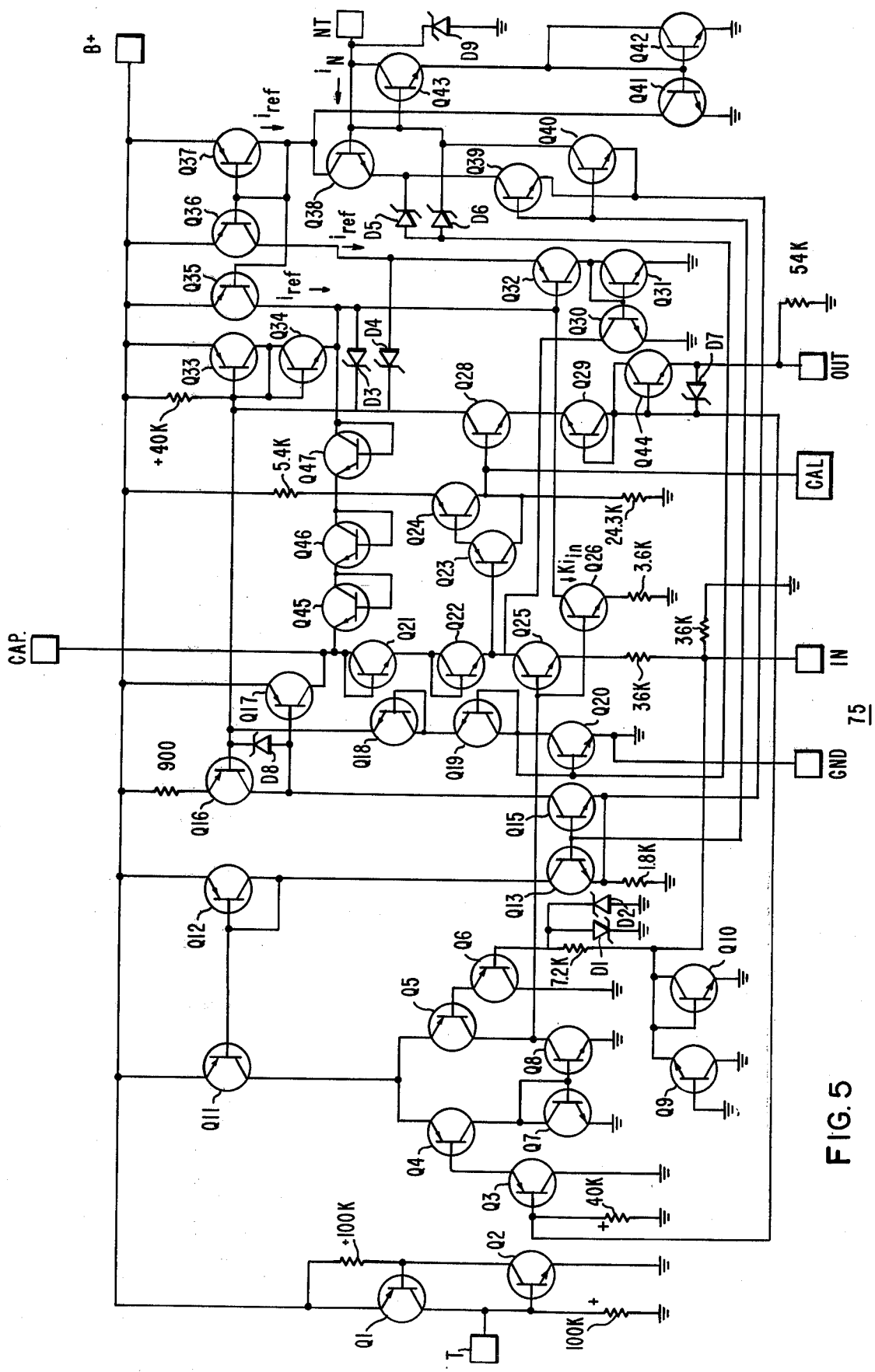
FIG. 5 is a schematic diagrams of the large scale integrated circuit device of FIGS. 3 and 4.

The circuitry of the chip 75, including input amplifier 30 with its two outputs $\alpha i_{in}$ and $K i_{in}$, is shown in FIG. 5. The output of transformer 18 produces a current $i_{in}$ flowing from pin IN. Input transistor Q25 is operated in a common base configuration which, by means of voltage feedback, maintains the IN terminal at a near virtual ground. This is achieved by means of the quad PNP configuration of Q3 through Q6. The bias current of about 14 µa fed into the quad network splits evenly because of the transistor mirror configuration of Q7 and Q8 into two 7 µa values. The base of Q3 is grounded through a 40 K pinch resistor; the quad network tries by feedback to maintain the base of Q6 near ground. Balance is actually achieved when the base of Q6 is approximately 5 mv below ground. Since the base of Q6 is tied to the input terminal IN through a 7.2 K resistor, at balance terminal IN has a −5 mv offset.

Should the current $i_{in}$ exceed the emitter current of Q25, the excess will flow from the base of Q6. This turns Q5 on harder while decreasing the collector current of Q8. The excess collector current is forced into the base of Q25 turning the transistor on harder, thereby increasing the current flow into the IN terminal. The negative feedback process will continue until the emitter current of Q25 once again equals $i_{in}$.

The collector output current of Q25, $\alpha i_{in}$, is slightly less than the input current because of the finite beta of Q25. A second output current $K i_{in}$ is produced by transistor Q26 which has a current output slightly less than ten times the input. This current is fed to the grounded neutral circuitry as will be explained below.

The 36 K resistor from IN to ground serves two purposes. First, it supplies a dc path for the base current of Q6 which, when added to the 7.2 K ohn series resistance, approximately balances the 40 K ohm base-to-ground resistance of Q3. The second purpose of the 36 K ohn resistor is to provide a discharge path for the magnetizing current of the transformer 18. The 36 K value is a compromise between the low value desired for the base current and the large value desired for resetting the magnetizing current. A value significantly less than this connected across winding 22 can result in a dc bias current being established in the winding 22 which would make the trip level a function of the magnetizing inductance. This in turn would make the trip level a function of temperature, as the magnetizing inductance is temperature dependent.

Positive feedback is provided to the base of Q3 from the OUT terminal of the chip. This forms the "antiphasing" network which causes the circuit to latch once it tries to trip. The base of Q3 is raised to about 2 volts by the feedback signal and held there by the SCR gate-to-cathode capacitor. By normal feedback action, the base of Q6 is also driven towards 2 volts which turns Q25 fully on causing a trip.

Transistors Q9 and Q10 and Schottky diodes D1 and D2 form an overcurrent protection network for the chip. The circuit is designed to trip with a 5 ma primary current in the transformer 18. The 3600 turns yield an output current of 1.4 µa which is the design level for the circuit. During high "bolted" ground fault current conditions of, for example, 5000 amperes, the output of winding 22 would become 1.4 amperes. Saturation of the transformer core limits the output current below this value; however, a large pulse current may result. The transistors Q9 and Q10 are large area, diode-connected, devices which bypass the large transformer output current while limiting the voltage at the IN terminal to ±1 V. Diodes D1 and D2, in combination with the 7.2 Kohm resistor, further limit the voltage at the base of Q6 to a value of about ±0.4 V which ensures that substrate diodes associated with Q6 are not activated.

INTEGRATOR AND POWER SUPPLY

The output $\alpha i_{in}$ of the input amplifier 30 feeds an integrator 36 which integrates the input current each half cycle. The integrated value is proportional to the half cycle average value of the ground current and is independent of any 120 HZ signal present. External capacitor C3, connected from terminal B+ to CAP performs the integration, since the voltage across a capacitor is proportional to the integral of the current through it. The voltage across C3 is detected by means of the darlington-connected emitter follower Q23 and Q24 which produces an output current proportional to the integral of $i_{in}$ over one half cycle. Diode-connected transistors Q21 and Q22 are used to balance the base emitter drops of Q23 and Q24.

The capacitor is reset at the beginning of each half cycle by means of Q17. The reset circuit works in combination with B+ power supply formed by passing an ac supply current of about 2 ma into the B+ terminal. The supply current is obtained by means of the 56 Kohm resistor R4 (FIG. 3) connected to the line conductor 10. The current entering the B+ terminal flows to ground through diode-connected Q33, Zener-connected Q18 and Q19 (base-to-emitter Zener voltage of about 6.3 volts), and diode-connected Q20. The B+ voltage is established at about 14 volts. The temperature coefficient of the Zener of about +2 mV/°C. cancels the diodes coefficient of about −2 mV/°C.

A current "mirror" is formed by Q33 and Q16 such that the Schottky-clamped transistor Q16 is on whenever the value of current through the B+ terminal exceeds a threshold large enough to cause Q33 to conduct. With Q16 on, transistor Q17 is off as the 14 μa bias current is diverted from the base of Q17. At the beginning of each half cycle, however, the current through B+ is below threshold and Q16 is off. The bias current then flows from the base of Q17 which turns Q17 on thus discharging C3. The capacitor thus starts each half cycle in a discharged condition.

Diode-connected transistors Q33, Q34, Q45, Q46, and Q47 are used to clip the capacitor current during a very large ground current. Without such a clamp, a possibility exists that Q23 could saturate, a condition not permitted in integrated circuit design.

BIAS CURRENT GENERATOR

As shown in FIG. 5, the supply current through B+ flows through diode-connected transistor Q20 during the positive half cycle of the line voltage. The 56 Kohm supply resistor R4 (FIG. 3) produces an average current of about 2 ma. A mirror arrangement of four transistors (Q13, Q15, Q39, and Q40), with a common emitter resistor, is used to generate the required bias currents of abouut 14 μa. The bias current is about 3 decades smaller than the supply current which, when coupled with 65 mv/decade characteristics of the base-emitter voltage versus log emitter current curve, indicates that the base-emitter drop of the mirror transistors will be about 97 mV less than the drop across Q20. The 200 mV appears across the common emitter resistor which, to produce 4×14 μa of current, should be a 1.8 K resistor.

GROUNDED NEUTRAL CIRCUITRY

As discussed previously, the circuit is designed to trip on the peak value of neutral-to-ground current if the ground resistance is less than 2 ohms. To do this, a reference current $i_{ref}$, proportional to the neutral voltage, is generated on the chip. The circuit for doing this is shown in FIG. 5. A current $i_N$, proportional to the neutral transformer voltage, is fed through an external resistor R2 into terminal NT. If this current is less than the current in Q40, it is shunted to ground by Q40 which turns Q38 off. When $i_N$ exceeds the collector current of Q40 the difference current is shunted to ground through Q43 which also turns Q38 on. The collector current of Q41 is summed with the collector of Q38 to form the current $i_{ref}$. The three transistor current mirror Q35, Q36, and Q37 is used to produce a Q35 collector current equal to $i_{ref}$. If $Ki_{in} < i_{ref}$, the difference flows into Schottky diode D3. The cathode of D3 is biased one P-N junction below B+ by means of Q33, and the anode of D3 is about 0.2 volts below B+. Transistor Q32 is off. The collector current of Q36 is diverted through D4.

When $Ki_{in} > i_{ref}$, the difference flows through diode clamps Q33 and Q34 which turns Q32 on. Its collector current $i_{ref}$ flows into Q31 which is mirrored by Q30 into the integrating capacitor. The value of K is about 10. The integrating capacitor current is more than 10 times (K+1) the value which it would be if the comparator circuit was not used. The resulting current is capable of charging the capacitor to the trip level during the short neutral pulse period.

The edge shaping of $i_N$ to form $i_{ref}$ is done to ensure that the grounded neutral circuitry does not effect the trip level during normal operation.

OUTPUT AND REFERENCE CIRCUITRY

The integral of the input current appears across C3. The darlington emitter follower amplifier causes the capacitor voltage to appear across the 5.4 Kohm emitter resistor of Q24. The emitter resistor voltage is amplified by the collector resistor by a factor of $24.3/5.4 \simeq 4.5$. The amplified value appears at the base of Q28, the external CAL terminal. When this value reaches a value of about 7.4 volts (base-emitter voltage of Q28 plus Zener voltage of Q29), current will begin to flow through Q28 and Q29 into the 40 K base resistor of Q3. The 7.4 volt value is temperature compensated, the −2 mV/°C. base-emitter characteristic being balanced by the +2 mV/°C. Zener characteristic. The voltage rise across the 40 K resistor represents positive feedback at the input which further increases the charging current of C3. This further increases the turn-on of Q28.

When the voltage drop across the 40 K resistor reaches about 0.7 volts, Q44 begins to conduct and C4 starts to charge. When the gate-cathode threshold of the SCR 52 is reached, the SCR 52 turns on and the breaker is tripped. The "anti-phasing" feature is achieved by C4. At a current just above threshold, the SCR 52 turns on at the end of the half cycle when the instantaneous line voltage is too small to trip the breaker. During the next negative half cycle of the line voltage, capacitor C4 is discharged through D7 and the 40 K resistors. The R-C time constant is such that at the beginning of the next positive half cycle, positive voltage feedback still exists at the base of Q3 which results in a very rapid charging of C3. The SCR is then turned on early in the cycle.

The "anti-phasing" circuit makes it possible to operate the circuit down to a line voltage of less than 50 V RMS.

Figure 4:
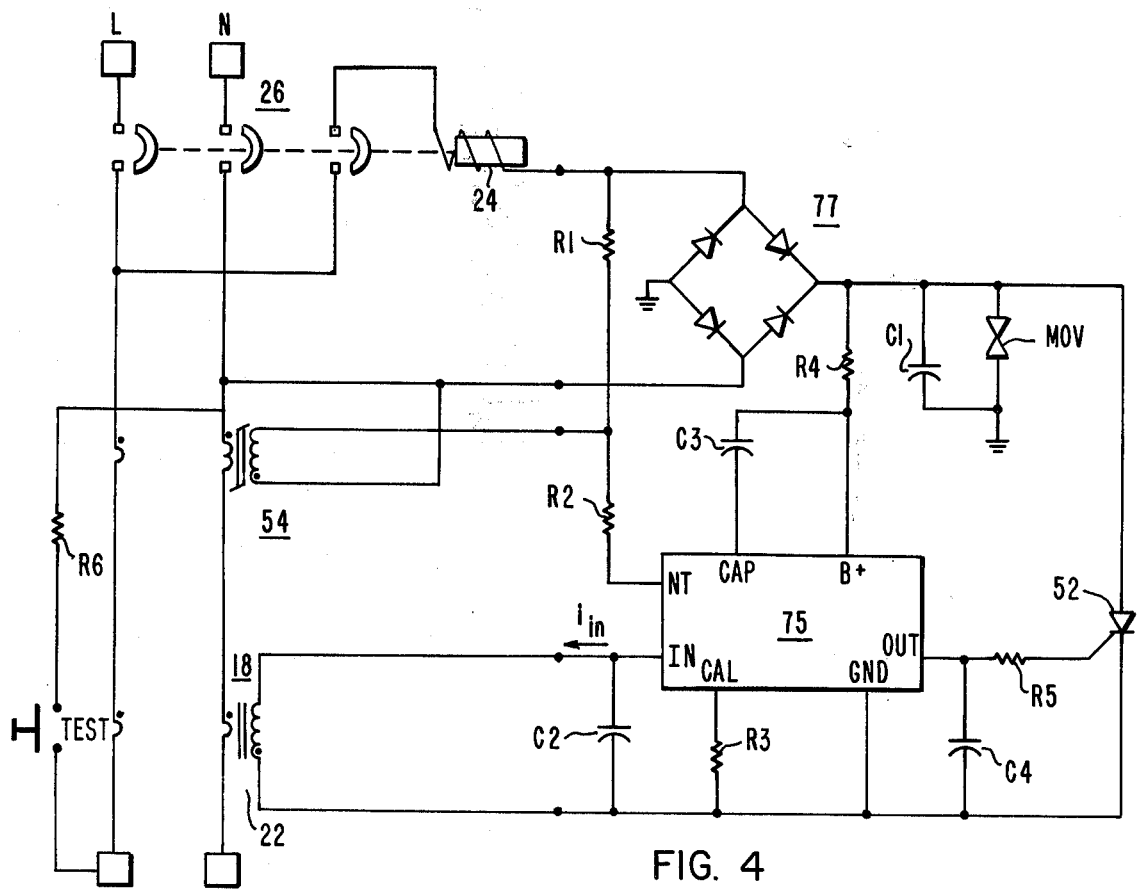
FIG. 4 is a schematic diagram of the present invention as embodied in a receptacle.

The receptacle unit is designed to trip for both polarities of line voltage since if the receptacle input power leads are reversed, the polarity of the output voltage must be reversed to produce the same polarity of current $i_{in}$, from the sensing winding 22. As mentioned earlier, the electronic circuit responds to only one polarity of $i_{in}$, and thus the circuit must be able to trip for both positive and negative line-to-ground voltage. A full wave bridge 77 is used to achieve this, as shown in FIG. 4.

The circuit includes the same integrated circuit chip 75 and responds to normal ground currents in the same manner as the breaker version. A possible problem does exist, however, because of the full wave operation of the chip. The chip is energized continuously, except near line voltage zero each half cycle; and thus any dc offset at terminal IN appears as a battery across the output of winding 22. If the offset is a positive value of, for example, 4 mv, a linearly increasing current will flow from the chip 75, out of terminal IN, into the winding 22. The rate of current increase will be governed by the magnetizing inductance $L_M$ of the transformer 18, approximately 100 henries, and the equation $di/dt = E_{O.S}/L_M \approx .04$ μA/ms. At zero line voltage the chip 75 is turned off and the current no longer increases. The current trapped in the magnetizing inductance continues to flow, however, as a 36K resistor within the chip 75 from IN to GND provides a closed path. The circuit now becomes a simple L-R series loop which results in an exponentially decaying magnetizing current with an L/R time constant of about 3 ms. The current has little time to decay during the short zero crossing interval, and thus it will continue to increase each half cycle until the value of $i_{in}$ reaches the trip level of the circuit. It should be noted that this problem does not exist in the breaker version as the core has nearly 9 ms, or three times constants, to reset during each negative half cycle of the line voltage.

The cause of the problem is the existence of a positive voltage offset at the IN terminal. A negative offset produces no problem as the input amplifier cannot sink current. Since current cannot flow into the IN terminal, the magnetizing current is zero. The problem is thus eliminated by designing the chip so that the input amplifiers offset is −5 mv nominal with an expected distribution of no more than ±4 mv from nominal.

The grounded neutral system also functions slightly differently in a receptacle version because of the existence of two "grounds" caused by the bridge 77. The neutral transformer 54 must be fed from an ac supply while the electronic circuit is fed from a dc source. This results in there being no common connection between 54 and the GND terminal of the chip 75. The current flow through R2 into the NT terminal is, thus, not proportional to the voltage across 54 during the negative half cycle. However, during the positive half cycle the current is proportional, and the grounded neutral system thus trips in the positive half cycle in the same manner as the breaker version.

The present invention provides a GFCI employing an integrator which approaches the performance of an ideal integrator, performing integration over a period of one half cycle. Thus, 120 Hz false currents produced by stray magnetic fields are effectively cancelled, reducing the dependence of the trip level current upon load current. Means are also provided to detect a grounded neutral condition through the use of a saturable transformer to induce a voltage pulse upon the neutral conductor. The saturable transformer method allows a reduction in the size and complexity of circuitry needed to provide grounded neutral protection. In addition, the problems associated with energizing an SCR at the end of a half cycle in the vicinity of current zero are alleviated through the use of the memory circuit to provide a positive firing signal at the beginning of the next succeeding half cycle.

It can be seen therefore that the present invention provides a ground fault circuit interrupter having improved performance, greater reliability, and decreased cost over the prior art.

I claim:

1. A ground fault protective apparatus for use on an AC electrical circuit having a line conductor and a neutral conductor grounded at a power source, comprising:
    means for sensing current imbalance on said line and neutral conductors, said sensing means providing an output signal proportional to said imbalance;
    means for integrating said output signal and for providing a trip indication whenever said signal integration value exceeds a predetermined reference level;
    means for inducing a test voltage on said neutral conductor, whereby a current imbalance is produced between said line and neutral conductors which is proportional to the neutral-to-ground conductance;
    means for providing a reference current proportional to said test voltage;
    means connected to the input of said integrating means for comparing said reference current to the output signal of said sensing means, said comparing means supplying a signal current to the input of said integrator whenever the output signal of said sensing means rises above said reference current, said signal current being of sufficient amplitude to cause said integrator means to produce a trip indication.

2. Apparatus as recited in claim 1 wherein said test voltage inducing means produces voltage pulses upon said neutral conductor.

3. Apparatus as recited in claim 2 wherein the peak value of said reference current is proportional to said test voltage and said comparing means compares the value of said reference current with the value of said sensing means output current.

4. Apparatus as recited in claim 3 wherein said reference current has an instantaneous value proportional to said induced voltage pulses, and a faster rise and decay time than said induced voltage pulses.

5. Apparatus as recited in claim 1 wherein said integrating means is reset every half cycle of frequency upon said line and neutral conductors.

6. Ground fault protective apparatus for use on an AC electrical circuit having a line conductor and a neutral conductor, comprising:
    means for sensing current imbalance on said line and neutral conductors, said sensing means providing an output signal proportional to said imbalance;
    means for integrating said output signal;
    means connected to said integrating means for providing a trip indication whenever the output of said intergating means exceeds a predetermined reference;
    means for resetting said integrating means after each half cycle of said AC electrical circuit; and
    means for generating a feedback signal to the input of said integrating means when the output of said integrating means exceeds a predetermined level.

7. Ground fault protective apparatus for use on an AC electrical circuit having a line conductor and a neutral conductor, comprising:
    means for sensing current imbalance on said line and neutral conductors, said sensing means providing an output signal proportional to said imbalance;
    means for integrating said output signal;
    means connected to said integrating means for providing a trip indication whenever the output of said integrating means exceeds a predetermined reference; and means for resetting said integrating means after each half cycle of said AC electrical circuit;

said trip indicating means comprising a switching device having an input terminal connected to said integrating means and an output circuit operable between open and closed positions in response to said input terminal, said apparatus comprising memory means connected to said input terminal for maintaining electrical parameters produced at said input terminal when said integrating means output exceeds said predetermined reference, whereby said switching device output terminals are maintained in the closed position for a period exceeding one half cycle on said line and neutral conductors.

8. Apparatus as recited in claim 7 wherein said switching device comprises a silicon controlled rectifier and said memory means comprises a capacitor.

9. Apparatus as recited in claim 7 comprising means connected to said memory means and the input of said integrating means for generating a positive feedback signal therebetween.

10. Apparatus as recited in claim 9 wherein said switching means comprises a silicon controlled rectifier and said memory means comprises a capacitor.

11. Ground fault protective apparatus for use on an AC electrical circuit having a line conductor and a neutral conductor, comprising:

means for sensing current imbalance on said line and neutral conductors, said sensing means providing an output signal proportional to said imbalance;

means for integrating said output signal;

means connected to said integrating means for providing a trip indication whenever the output of said integrating means exceeds a predetermined reference; and means for generating a feedback signal to the input of said integrating means when the output of said integrating means exceeds a predetermined level.

12. Ground fault protective apparatus for use on an AC electrical circuit having a line conductor and a neutral conductor, comprising:

means for sensing current imbalance on said line and neutral conductors, said sensing means providing an output signal proportional to said imbalance;

means for integrating said output signal;

first trip means connected to said integrating means for providing a trip indication whenever the output of said integrating means exceeds a predetermined reference;

means for inducing a test voltage upon said neutral conductor, whereby a current imbalance is produced between said line and neutral conductors which is proportional to the neutral-to-ground conductance; and second trip means connected to said sensing means and responsive to the instantaneous value of said sensing means output signal for producing a trip indication when the instantaneous value of said output signal exceeds a second predetermined reference level.

13. Apparatus as recited in claim 12 wherein said induced neutral test voltage comprises a plurality of voltage pulses and said second trip means is responsive to the peak value of output signal pulses produced in response to said voltage pulses upon conditions of high neutral-to-ground conductance.

14. Apparatus as recited in claim 12 wherein said second trip means is connected to the input of said integrating means and produces a large input signal to said integrating means when said output signal exceeds said second predetermined reference level, whereby the output of said integrating means is caused to exceed said first predetermined level and actuate said first trip means to provide a trip indication.

15. Apparatus as recited in claim 12 wherein said integrating means is reset after each half cycle of load current through said apparatus.

16. Apparatus as recited in claim 15 wherein said induced neutral test voltage comprises a plurality of voltage pulses and said second trip means is responsive to the peak value of corresponding current pulses produced by said sensing means upon conditions of high neutral to ground conductance, and said apparatus further comprises means for shaping said output current pulses before applying said output current pulses to said second trip means.

* * * * *